(12) United States Patent
Nakanishi

(10) Patent No.: US 7,701,633 B2
(45) Date of Patent: Apr. 20, 2010

(54) PRISM OPTICAL SYSTEM AND IMAGE PICKUP APPARATUS

(75) Inventor: Hitoshi Nakanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 11/645,575

(22) Filed: Dec. 27, 2006

(65) Prior Publication Data
US 2007/0165509 A1    Jul. 19, 2007

(30) Foreign Application Priority Data
Jan. 16, 2006    (JP) ............................. 2006-006877

(51) Int. Cl.
G02B 5/30    (2006.01)
(52) U.S. Cl. .................... 359/498; 359/497; 359/502
(58) Field of Classification Search ............. None
See application file for complete search history.

(56) References Cited

U.S. PATENT DOCUMENTS

| 4,587,553 | A | * | 5/1986 | Watanabe et al. ......... 348/816 |
| 5,659,411 | A | * | 8/1997 | Nito et al. ................ 349/117 |
| 5,739,855 | A | * | 4/1998 | Centen et al. ............. 348/342 |
| 5,781,236 | A | * | 7/1998 | Shinbori et al. .......... 348/342 |
| 2002/0158985 | A1 | * | 10/2002 | Saitoh et al. ............ 348/340 |

FOREIGN PATENT DOCUMENTS

| JP | 04-192782 A | 7/1992 |
| JP | 09-325204 A | 12/1997 |
| JP | 2001-272632 | 10/2001 |
| JP | 2005-020416 A | 1/2005 |

* cited by examiner

Primary Examiner—Arnel C Lavarias
(74) Attorney, Agent, or Firm—Rader, Fishman & Grauer PLLC

(57) ABSTRACT

A prism optical system including an optical low-pass filter disposed on an incident side of a luminous flux, and a prism arranged to perform a color separation to a plurality of color bands by an optical thin film, the prism optical system includes the optical low-pass filter disposed on an incident side of the prism, and at least two quarter-wave plates having a phase elimination function, and each disposed on one of an incident surface and an outgoing surface of the luminous flux of the optical low-pass filter. The prism optical system is configured to satisfy the following equation, $$|X1/X2|>0.7$$

where X1 is a phase elimination efficiency at 550 nm wavelength when the incident side quarter-wave plate is inserted between crossed nicols, and X2 is a phase elimination efficiency at 550 nm wavelength when the outgoing side quarter-wave plate is inserted between the crossed nicols.

10 Claims, 4 Drawing Sheets

PRISM OPTICAL SYSTEM AND IMAGE PICKUP APPARATUS

CROSS REFERENCES TO RELATED APPLICATIONS

The present invention contains subject matter related to Japanese Patent Application JP 2006-006877 filed in the Japanese Patent Office on Jan. 16, 2006, the entire contents of which being incorporated herein by reference.

BACKGROUND OF THE INVENTION

The present invention relates to an optical low-pass filter to prevent an image degradation by filtering a wave of an optical false signal, and a prism optical system equipped with a prism to perform color separation to a plurality of color bands.

In recent years, in a case in which image pickup devices such as a CCD and a CMOS are used in a video camera and a digital still camera, it is necessary to hold, in a barrel, an optical low-pass filter for filtering unwanted high-frequency components, so as to prevent generation of colors false signals and moiré fringes and so on.

An optical low-pass filter of a related art for a video camera with a color separation prism is provided with a board having a phase elimination characteristic described below in patent documents 1 and 2.

[patent document 1] Japanese Patent Application Publication H11-218612
[patent document 2] Japanese Patent Application 2001-272632

SUMMARY OF THE INVENTION

In the optical low-pass filters of the related art including the optical low-pass filter described in the patent documents 1 and 2, when the optical low-pass filter is arranged inside out, the luminous flux without the phase elimination enters the color separation prism because the board with the phase elimination characteristic is arranged on an outgoing surface of the luminous flux, and there is a problem to deteriorate a color separation efficiency by an optical thin film. Moreover, it is difficult to improve the color separation efficiency with respect to an arbitrary wave length. In recent years, picture elements of the image pickup device are downsized. Consequently a thickness of a birefringence plate of the optical low-pass filter made of a crystal glass become thin, and it is difficult to ensure profile irregularity.

The present invention was accomplished in light of the above-mentioned circumstances. It is desirable to provide a prism optical system and an image pickup apparatus arranged to prevent a deterioration of a color separation efficiency by a color separation prism even when an optical low-pass filter is arranged inside out.

A prism optical system according to an embodiment of the present invention includes an optical low-pass filter disposed on an incident side of a luminous flux, and a prism arranged to perform a color separation to a plurality of color bands by an optical thin film. The prism optical system includes the optical low-pass filter disposed on an incident side of the prism; and at least two quarter-wave plates having a phase elimination function, and each disposed on one of an incident surface and an outgoing surface of the luminous flux of the optical low-pass filter. The prism optical system is configured to satisfy the following equation, $$|X1/X2|>0.7$$

where X1 is a phase elimination efficiency at 550 nm wavelength when the incident side quarter-wave plate is inserted between crossed nicols, and X2 is a phase elimination efficiency at 550 nm wavelength when the outgoing side quarter-wave plate is inserted between the crossed nicols.

The optical low-pass filter includes at least one intermediate side quarter-wave plate with the phase elimination function which is disposed between the incident side quarter-wave plate and the outgoing side quarter-wave plate; and the prism optical system is configured to satisfy the following equation, $$|X1/X3|>0.7$$

where X3 is the phase elimination efficiency of the intermediate side quarter-wave plate at 550 nm wavelength.

The quarter-wave plate of the optical low-pass filter is made of a board made from an organic material.

The quarter-wave plate of the optical low-pass filter is made of a board made from a uniaxal crystal glass material.

The optical low-pass filter is provided with an infrared cut effect.

The optical low-pass filter is provided with an ultraviolet cut effect.

The low-pass filter includes a first optical low-pass filter provided with an infrared cut effect, and a second optical low-pass filter provided without the infrared cut effect; and at least one of the first and second optical low-pass filters is arranged to be detachable.

The optical low-pass filter and the prism are different components.

The optical low-pass filter and the prism are integrated with each other.

An image pickup apparatus according to another embodiment of the present invention includes a prism optical system including an optical low-pass filter disposed on an incident side of a luminous flux, and a prism arranged to perform a color separation to a plurality of color bands by an optical thin film, the prism optical system includes the optical low-pass filter disposed on an incident side of the prism; and at least two quarter-wave plates having a phase elimination function, and each disposed on one of an incident surface and an outgoing surface of the luminous flux of the optical low-pass filter. The prism optical system is configured to satisfy the following equation, $$|X1/X2|>0.7$$

where X1 is a phase elimination efficiency at 550 nm wavelength when the incident side quarter-wave plate is inserted between crossed nicols, and X2 is a phase elimination efficiency at 550 nm wavelength when the outgoing side quarter-wave plate is inserted between the crossed nicols.

The optical low-pass filter includes at least one intermediate side quarter-wave plate with the phase elimination function which is disposed between the incident side quarter-wave plate and the outgoing side quarter-wave plate; and the prism optical system is configured to satisfy the following equation, $$|X1/X3|>0.7$$

where X3 is the phase elimination efficiency of the intermediate side quarter-wave plate at 550 nm wavelength.

(1) According to the embodiment of the present invention, even when the optical low-pass filter is arranged inside out, the phase elimination function acts. It is possible to perform the color separation to the arbitrary ideal wave length, without deteriorating the color separation efficiency by the color separation prism.

Moreover, it is possible to simplify the manufacturing process of the prism optical system.

(2) According to the embodiment of the present invention, even when the optical low-pass filter is arranged inside out, the phase elimination function acts. It is possible to perform the color separation to the arbitrary ideal wave length, without deterioration the color separation efficiency by the color separation prism. Accordingly, it is possible not to generate the false signal at the image pickup device.

(3) According to the embodiment of the present invention, the quarter-wave plate is formed from, for example, resin, and it is possible to reduce the cost.

(4) According to the embodiment of the present invention, the quarter-wave plate is formed from the single crystal material, and it is possible to readily ensure the profile irregularity, and to expand the degree of the freedom of the design.

(5) The apparatus according to the embodiment of the present invention has the infrared cut effect, and it is possible to extend the function, and to decrease the number of the components.

(6) The apparatus according to the embodiment of the present invention has the ultraviolet cut effect, and it is possible to ensure the reliability of the image pickup device. Moreover, there is provided the ultraviolet cut coat by, for example, the evaporation, and it is possible to decrease the number of the components.

(7) According to the embodiment of the present invention, it is possible to constitute for the low light level photographing.

(8) According to the embodiment of the present invention, the optical low-pass filter and the color separation prism are different members, and it is possible to provide an air layer between the incident surface and the outgoing surface of the luminous flux of the optical low-pass filter, and to ensure the profile irregularity.

(9) According to the embodiment of the present invention, it is possible to simplify the manufacturing process, and to decrease the number of the components.

BRIEF DESCRIPTION OF THE DRAWINGS

FIG. 1A is a block diagram when an optical low-pass filter is arranged on a front side; and FIG. 1B is a block diagram when the optical low-pass filter is arranged on-a back side.

DETAILED DESCRIPTION OF THE INVENTION

Hereinafter, embodiments of the present invention are illustrated in detail in reference to drawings, and however the present invention is not limited to the embodiments described below.

Figure 1A:
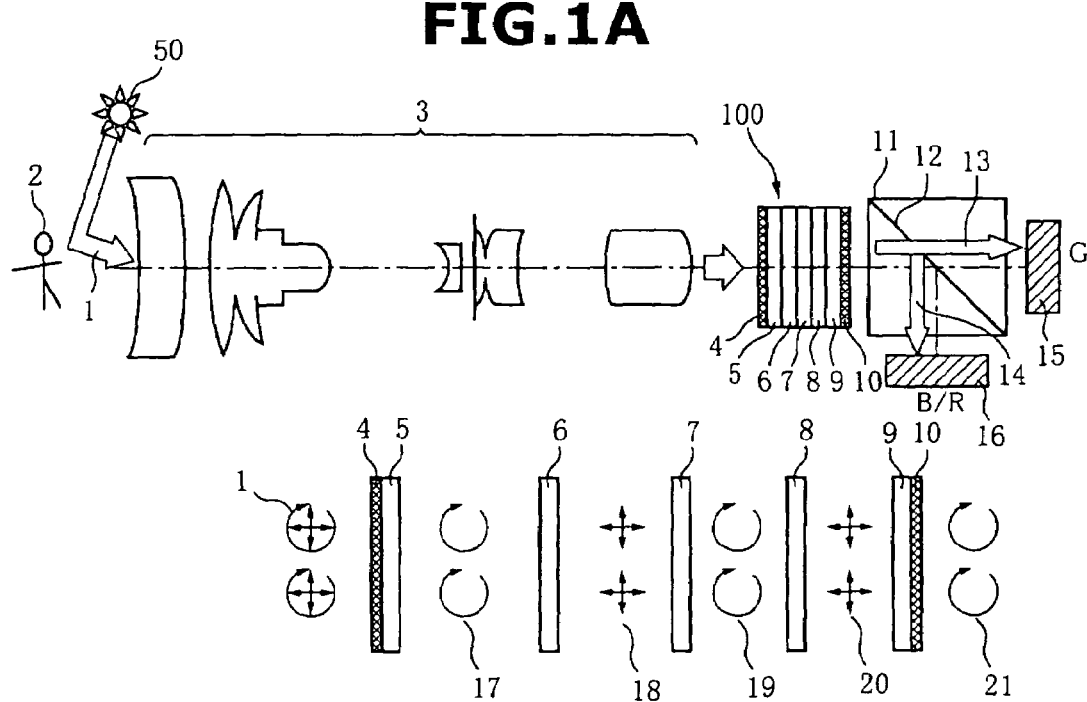
FIGS. 1A and 1B show prism optical systems according to one embodiment of the present invention.

FIG. 1A is a view showing a prism optical system according to one embodiment of the present invention. In FIG. 1, a numeral 3 designates an image pickup lens, a numeral 11 designates a color separation prism performing a color separation to a plurality of color bands by an optical thin film 12, numerals 15 and 16 designate image pickup devices such as CCD, and a numeral 100 designates an optical low-pass filter disposed between the image pickup lens 3 and the color separation prism 11 by a predetermined distance.

Optical low-pass filter 100 is formed by alternately affixing quarter-wave plates 5, 7 and 9 each made of a ¼ wave length plate to convert a linearly polarized light to a circularly polarized light, and birefringence plates 6 and 8 to convert the circularly polarized light to the linearly polarized light, and by evaporating thin films 4 and 10 on one sides of the phase elimination plates 5 and 9 respectively.

In the configuration of FIG. 1A, in a case of shooting, luminous flux 1 emitted from a body 50 (light source such as the sun) is reflected on an object 2, passes through the image pickup lens 3, passes through the thin film 4 evaporated on the one side of the quarter-wave plate 5, the quarter-wave plate 5, the birefringence plate 6, the quarter-wave plate 7, the birefringence plate 8, the quarter-wave plate 9, the thin film 10 evaporated on the one side of the quarter-wave plate 9, in this order, and enters the color separation prism 11.

The luminous flux entered in the color separation prism 11 undergoes the color separation by the optical thin film 12, and a luminous flux 13 enters an image pickup device 15 (for green), and a luminous flux 14 enters an image pickup device 16 (for blue and red). In this case, an infrared radiation is removed from the luminous flux passing through the lens system, by the thin film 4 evaporated on an incident surface of the quarter-wave plate 5. Consequently, the luminous flux ideal for a normal image pickup reaches the image pickup device 15 and the image pickup device 16

In this case, the luminous flux 1 becomes a circularly polarized luminous flux 17 by the quarter-wave plate 5, and enters the birefringence plate 6. The luminous flux 17 is separated in an arbitrary direction by arbitrary widths of the ordinary ray·the extraordinary ray, by a birefringence effect, by $d = T \cdot ((no^2 - ne^2) \cdot \tan \theta)/(no^2 \cdot \tan \theta + ne^2)$ where in the birefringence plate 6, a plate thickness is T, a separation width is d, an ordinary ray refractive index is no, an extraordinary ray refractive index is ne, and an incident angle is θ, and becomes a linearly polarized luminous flux 18. Then, the linearly polarized luminous flux 18 becomes a circularly polarized luminous flux 19 by the quarter-wave plate 7, and enters the birefringence plate 8. Circularly polarized luminous flux 19 becomes a linearly circularly polarized luminous flux 20 by the same effect as the birefringence plate 6. The luminous flux 21 returned to the circularly polarized light by the quarter-wave plate 9 enters the color separation prism 11.

In this case, when equation (1) is satisfied, it is possible to perform the color separation to an ideal and arbitrary wave length which is separated by the optical thin film 12 of the color separation prism 11. Accordingly, it is possible not to generate false signal without deteriorating resolving power of the image pickup lens 3.

$$|X1/X2| > 0.7 \quad (1)$$

where, in a case in which a phase elimination efficiency is a transmittance when the quarter-wave plate is inserted between crossed nicols, X1 is the phase elimination efficiency of the quarter-wave plate 5 at 550 nm wavelength, and X2 is the phase elimination efficiency of the quarter-wave plate 9 at 550 nm wavelength. When this condition is not satisfied, it is difficult not to generate the false signal at the image pickup element by the birefringence effect of the birefringence plate 6 and the birefringence plate 8, without deteriorating resolving power of the image pickup lens 3.

Figure 1B:
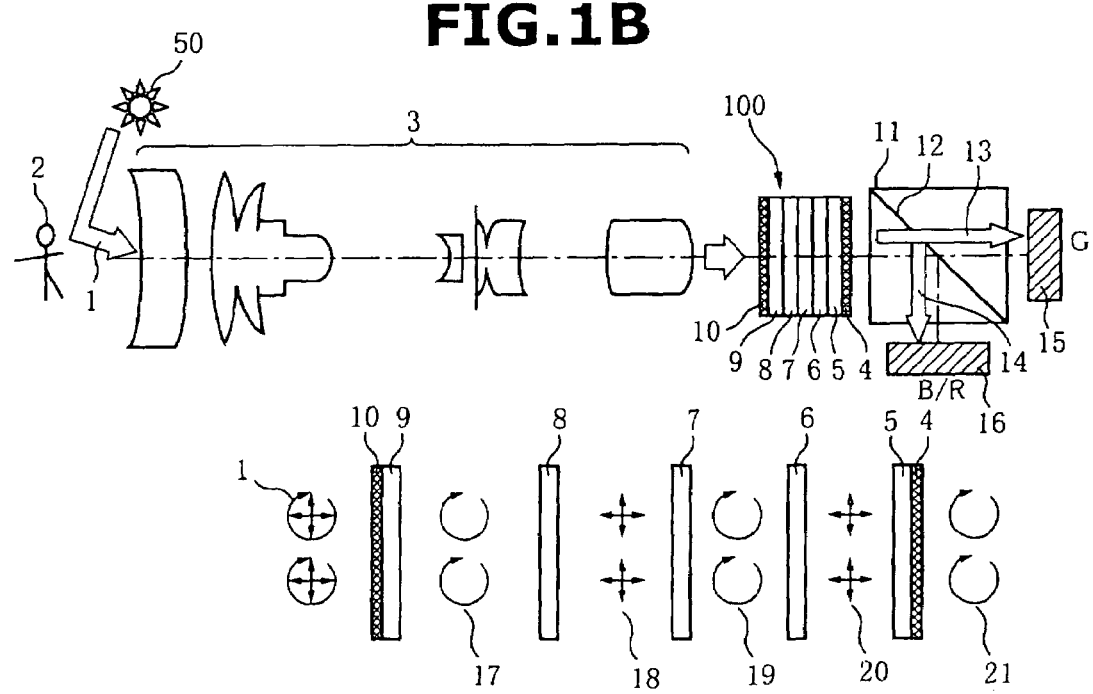

Moreover, FIG. 1B is a view showing a prism optical-system according to one embodiment, and including the optical low-pass filter 100 attached with respect to the image pickup devices 15 and 16 inside out. The luminous flux 1 emitted from the body 50 is reflected by the object 2, passes through the image pickup lens 3, passes through the thin film 10 evaporated on one surface of the quarter-wave plate 9, the quarter-wave plate 9, the birefringence plate 8, the quarter-wave plate 7, the birefringence plate 6, the quarter-wave plate 5, and the thin film 4 evaporated on one surface of the quarter-wave plate 5, in this order, and enters the color separation prism 11.

The luminous flux entered in the color separation prism undergoes the color separation by the optical thin film 12, the luminous flux 13 enters the image pickup device 15, and the luminous flux 14 enters the image pickup device 16. In this case, the infrared radiation is removed from the luminous flux passing through the lens system, by the thin film 4 evaporated on an outgoing surface of the quarter-wave plate 5, and the luminous flux necessary for the normal image pickup reaches the image pickup device 15 and the image pickup device 16.

In this case, the luminous flux 1 becomes the circularly polarized luminous flux 17 by the quarter-wave plate 9, and enters the birefringence plate 8. The luminous flux 17 is separated in an arbitrary direction by arbitrary separation widths of the ordinary ray·extraordinary ray, by the birefringence effect, by $d=T\cdot((no^2-ne^2)\cdot\tan\theta)/(no^2\cdot\tan\theta+ne^2)$ where in the birefringence plate 8, a plate thickness is T, a separation width is d, an ordinary ray refractive index is no, an extraordinary ray refractive index is ne, and an incident angle is θ, and becomes the linearly polarized luminous flux 18. The linearly polarized luminous flux 18 becomes the circularly polarized luminous flux 19 by the quarter-wave plate 7, and enters the birefringence plate 6. The circularly polarized light 19 becomes the linearly polarized luminous flux 20 by the same effect as the birefringence plate 8, and returns to the circularly polarized light by the quarter-wave plate 5 to become the luminous flux 21. The luminous flux 21 enters the color separation prism 11. In this case, when the following equation is satisfied, it is possible to perform the color separation to an ideal and arbitrary wave length which is separated by the optical thin film 12 of the color separation prism 11. Accordingly, it is possible not to generate the false signal without deteriorating the resolving power of the image pickup lens 3.

$$|X1/X2|>0.7$$

where X1 is the phase elimination efficiency of the quarter-wave plate 5 at 550 nm wavelength, and X2 is the phase elimination efficiency of the quarter-wave plate 9 at 550 nm wavelength. When this condition is not satisfied, it is difficult not to generate the false signal at the image pickup device by the birefringence effect of the birefringence plate 6 and the birefringence plate 8, without deteriorating the resolving power of the lens.

In this case, when the equation (2) is satisfied, it is possible to perform the color separation to further optimum arbitrary wave length.

$$|X1/X3|>0.7 \qquad (2)$$

where X3 is a phase elimination efficiency of the quarter-wave plate 7 disposed at a central position of the optical low-pass filter 100. When this condition is not satisfied, it is difficult not to generate the false signal at the image pickup device by the birefringence effect of the birefringence plate 6 and the birefringence plate 8, without deteriorating the resolving power of the lens.

Moreover, in a case in which the quarter-wave plates 5 and 9 are made from an organic material such as resin, it is possible to form the constitution inexpensively. In a case in which the quarter-wave plates 5 and 9 are made from a uniaxal crystal glass, it is possible to ensure the profile irregularity, and to ensure the thicknesses of the quarter-wave plates 5 and 9 which are arranged on the incidence surface and the outgoing surface of the optical low-pass filter when the above-described equation is satisfied. When the above-described equation is not satisfied, the quarter-wave plates 5 and 9 become thin, and it is difficult to ensure the profile irregularity.

Figure 2:
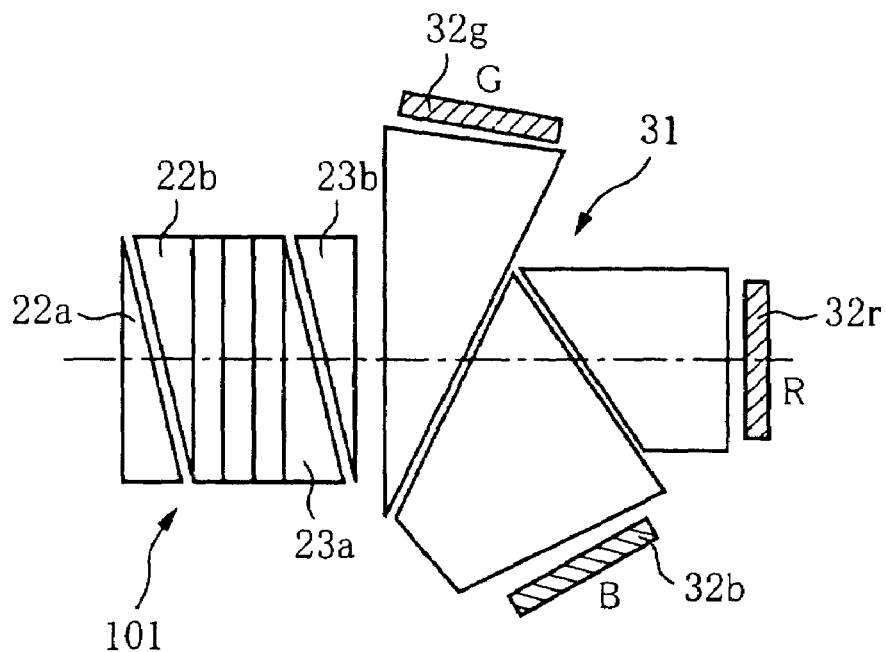
FIG. 2 is a block diagram showing a prism optical system according to another embodiment of the present invention.

FIG. 2 is a view showing a prism optical system according to one embodiment, and including two quarter-wave plates of the incident surface of the optical low-pass filter, and two quarter-wave plates of the outgoing surface of the optical low-pass filter. In this case, quarter-wave plates 22a, 22b, 23a and 23b use Wollaston prisms, and it is possible to make the polarized light luminous flux which further improves the efficiency.

In FIG. 2, a numeral 101 designates an optical low-pass filter including the quarter-wave plates 22a, 22b, 23a and 23b serving as the quarter-wave plates of the incident surface and the outgoing surface of the optical low-pass filter 100 of FIG. 1. A numeral 31 designates a color separation prism for performing the color separation to three colors, and numerals 32r, 32g and 32b indicate an image pickup device for red, an image pickup device for green, and an image pickup device for blue, respectively.

Figure 3:
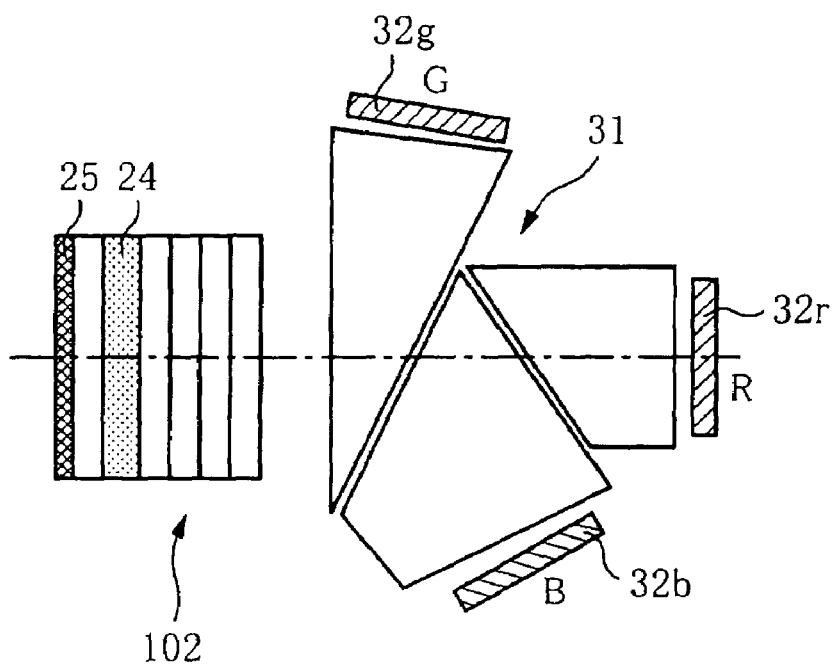
FIG. 3 is a block diagram showing a prism optical system according to another embodiment of the present invention.

FIG. 3 is a view showing a prism optical system according to one embodiment of the present invention, and including the optical low-pass filter used in FIG. 1, and equipped with an infrared cut filter 24 of an absorption type and an ultraviolet cut coat 25. There are provided the infrared cut filter 24 of the absorption type and the ultraviolet cut coat 25, and accordingly it is possible to decrease a near-infrared radiation luminous flux and an ultraviolet luminous flux which are detrimental to the image pickup device.

In FIG. 3, a numeral 102 designates an optical low-pass filter that the infrared cut filter 24 and the ultraviolet cut coat 25 are provided to the optical low-pass filter 100 of FIG. 1, and the other parts are assigned by the same symbols as FIG. 2. Besides, it is possible to readily provide and arrange the ultraviolet cut coat 25 by the evaporation.

Figure 4A:
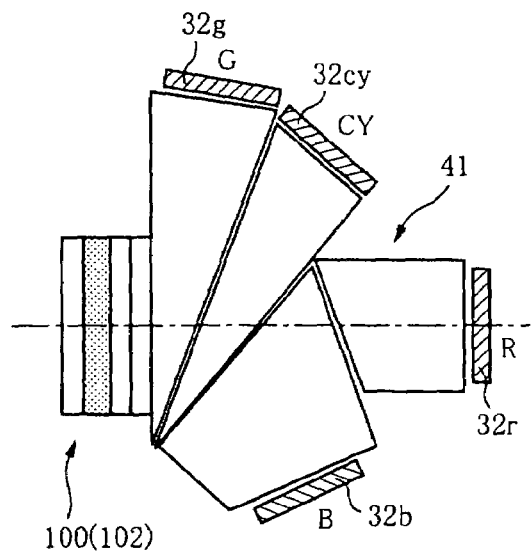
FIGS. 4A and 4B are block diagrams showing a prism optical system according to another embodiment of the present invention.
Figure 4B:
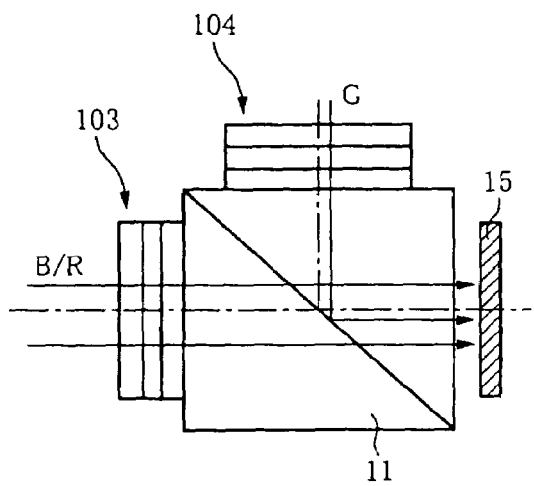

FIGS. 4A and 4B are views showing prism optical systems according to an embodiment of the present invention, and including an optical low pass filter which includes at least one quarter-wave plate of the incident side, and at least one quarter-wave plate of the outgoing side, and which are integrated with the color separation prism by the adhesion. In FIG. 4A, a numeral 41 designates a color separation prism for performing the color separation to the four colors, which is bonded to the optical low-pass filter 100 of FIG. 1 or the optical low-pass filter 102 of FIG. 2. Besides, a numeral 32cy designates an image pickup device for turquoise, and the other parts are assigned by the same symbols as FIG. 3.

In FIG. 4B, numerals 103 and 104 designate optical low-pass filters each provided with the quarter-wave plate on incident side and the quarter-wave plate on the outgoing side, like the low-pass optical filter 100 of FIG. 1, and bonded, respectively, to two surfaces of the color separation prism 11 which are perpendicular to each other. The arrangement of FIG. 4B is arranged so that the luminous fluxes passing through color separation prism 11 from directions perpendicular to each other enter the image pickup device 15.

The optical low-pass filter and the color separation prism are integrated by the adhesion as shown in FIG. 4, and accordingly it is possible to simplify the manufacturing process, and to decrease the number of the components.

Figure 5:
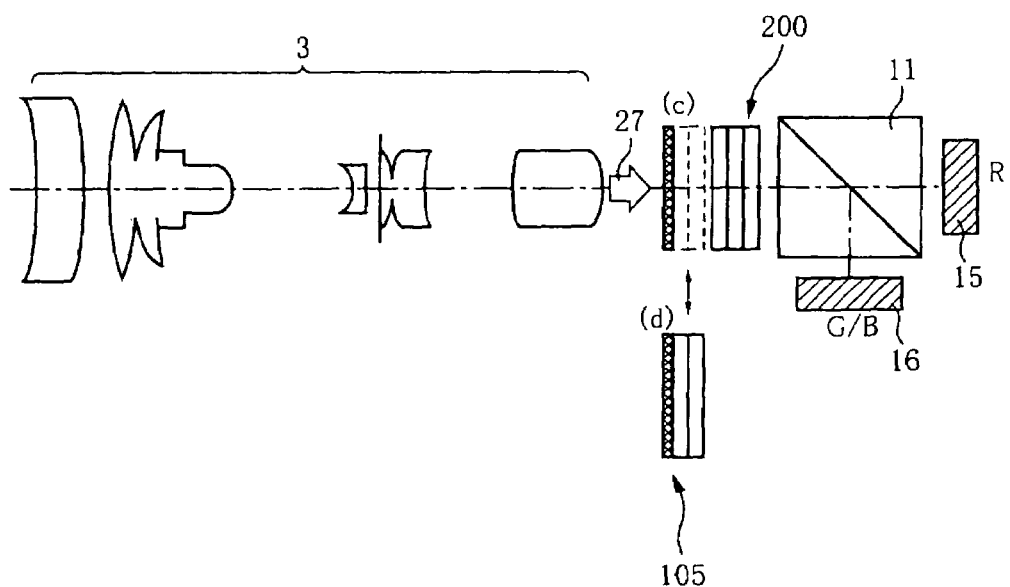
FIG. 5 is a block diagram showing a prism optical system according to another embodiment of the present invention.

FIG. 5 is a view showing a prism optical system according to one embodiment, and including an optical low-pass filter which is provided with the infrared cut effect, and an optical low-pass filter which is not provided with the infrared cut effect. Either one of the two optical low-pass filters of FIG. 5 is movable. In FIG. 5, a numeral 105 designates an optical low-pass filter having, for example, the infrared cut filter 24 of FIG. 3, and arranged to move between a position of an optical path of the luminous flux 27 and a position other than that position of the optical path.

A numeral 200 designates, for example, an optical low-pass filter which is not provided with the infrared cut effect, like the optical low-pass filter 100 of FIG. 1, and which is disposed on the incident side of the color separation prism 11. Besides, the other parts of FIG. 5 are assigned by the same symbols as FIG. 1.

The optical low-pass filter 105 with the infrared cut effect is disposed at a position (c) shown in FIG. 5 at a normal shooting, and moved to a position (d) shown in FIG. 5 at a low light level shooting. Accordingly, it is possible to prevent the unnecessary infrared radiation of the luminous flux 27 from entering the image pickup devices 15 and 16 at the normal photographing, and to allow the infrared radiation to enter the image pickup devices 15 and 16 at the low light level shooting.

Figure 6:
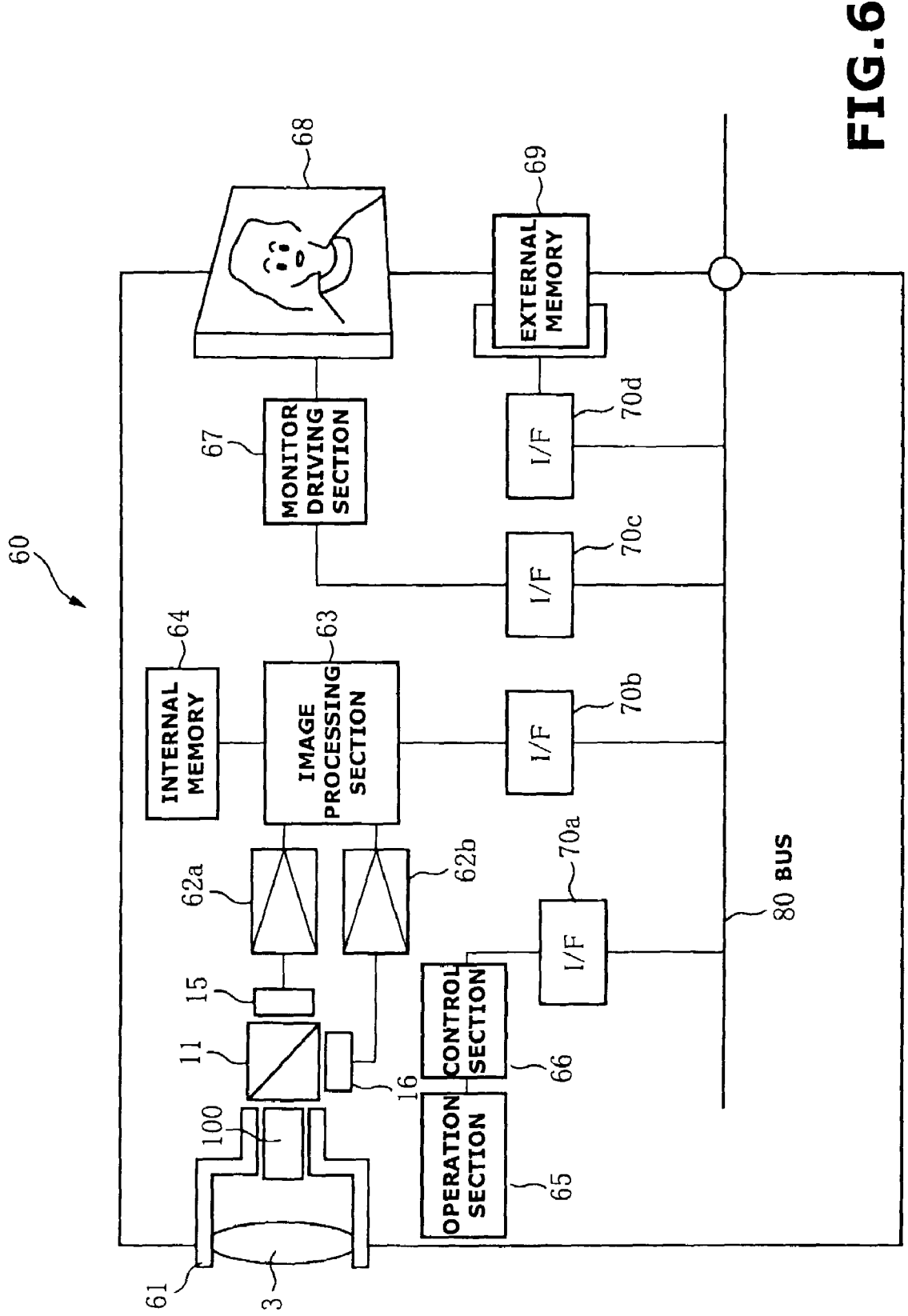
FIG. 6 is a block diagram showing an image pickup apparatus according to one embodiment of the present invention.

FIG. 6 is a view showing an image pickup apparatus equipped with the prism optical system according to the embodiment of the invention. In FIG. 6, a numeral 61 designates a barrel of an image pickup apparatus 60. The image pickup lens 3 and the optical low-pass filter 100 described in FIG. 1 are disposed within barrel 61.

The light entered through the image pickup lens 3, the optical low-pass filter 100, the color separation prism 11 is converted to an electric signal by the image pickup devices 15 and 16. This electric signal is amplified by amplifiers 62a and 62b, and inputted to an image processing section 63.

Moreover, the image pickup apparatus 60 includes an internal memory 64 storing a processing data and so on of image processing section 63, an operation section 65, a control section 66, a monitor driving section 67, a monitor 68 capable of playing the photographed images concurrently, and an external memory 69 and so on.

The control section 66, the image processing section 63, the monitor driving section 67 and the external memory 69 are connected, respectively, through interfaces I/F 70a~70d to a common bus 80.

In the image pickup apparatus 60 arranged in this way, even when the optical low-pass filter 100 is arranged inside out, it is possible to perform the color separation to the appropriate wave length by acting the phase elimination function, like FIG. 1. Accordingly, it is possible not to generate the false signal at the image pickup devices 15 and 16 without deteriorating the resolving power.

It should be understood by those skilled in the art that various modifications, combinations, sub-combinations and alterations may occur depending on design requirements and other factors insofar as they are within the scope of the appended claims or the equivalents thereof.

What is claimed is:

1. A prism optical system including an optical low-pass filter disposed on an incident side of a luminous flux, and a prism arranged to perform a color separation to a plurality of color bands by an optical thin film, the prism optical system comprising:
   the optical low-pass filter disposed on an incident side of the prism; and
   at least two quarter-wave plates having a phase elimination function, and each disposed on one of an incident surface and an outgoing surface of the optical low-pass filter;
   wherein the prism optical system is configured to satisfy the following equation, $|X1/X2|>0.7$, where X1 is a phase elimination efficiency at 550 nm wavelength when the incident side quarter-wave plate is inserted between crossed Nicols, and X2 is a phase elimination efficiency at 550 nm wavelength when the outgoing side quarter-wave plate is inserted between the crossed Nicols, and
   wherein the optical low-pass filter includes at least one intermediate side quarter-wave plate with the phase elimination function which is disposed between the incident-side quarter-wave plate and the outgoing side quarter-wave plate; and the prism optical system is configured to satisfy the following equation, $|X1/X3|>0.7$, where X3 is the phase elimination efficiency of the intermediate side quarter-wave plate at 550 nm wavelength.

2. The prism optical system as claimed in claim 1, wherein the quarter-wave plate of the optical low-pass filter is made of a board made from an organic material.

3. The prism optical system as claimed in claim 1, wherein the quarter-wave plate of the optical low-pass filter is made of a board made from a uniaxial crystal glass material.

4. The prism optical system as claimed in claim 1, wherein the optical low-pass filter is provided with an infrared cut effect.

5. The prism optical system as claimed in claim 4, wherein the low-pass filter includes a first optical low-pass filter provided with an infrared cut effect, and a second optical low-pass filter provided without the infrared cut effect; and at least one of the first and second optical low-pass filters is arranged to be detachable.

6. The prism optical system as claimed in claim 1, wherein the optical low-pass filter is provided with an ultraviolet cut effect.

7. The prism optical system as claimed in claim 1, wherein the low-pass filter includes a first optical low-pass filter provided with an infrared cut effect, and a second optical low-pass filter provided without the infrared cut effect; and at least one of the first and second optical low-pass filters is arranged to be detachable.

8. The prism optical system as claimed in claim 1, wherein the optical low-pass filter and the prism are different components.

9. The prism optical system as claimed in claim 1, wherein the optical low-pass filter and the prism are integrated with each other.

10. The prism optical system as claimed in claim 1, wherein the prism optical system is provided in an image pickup apparatus.

* * * * *